July 2, 1963 G. A. WILSON 3,096,423
UNITARY MULTI-PHASE TERMINAL SUPPORT
Filed Feb. 24, 1960 2 Sheets-Sheet 1
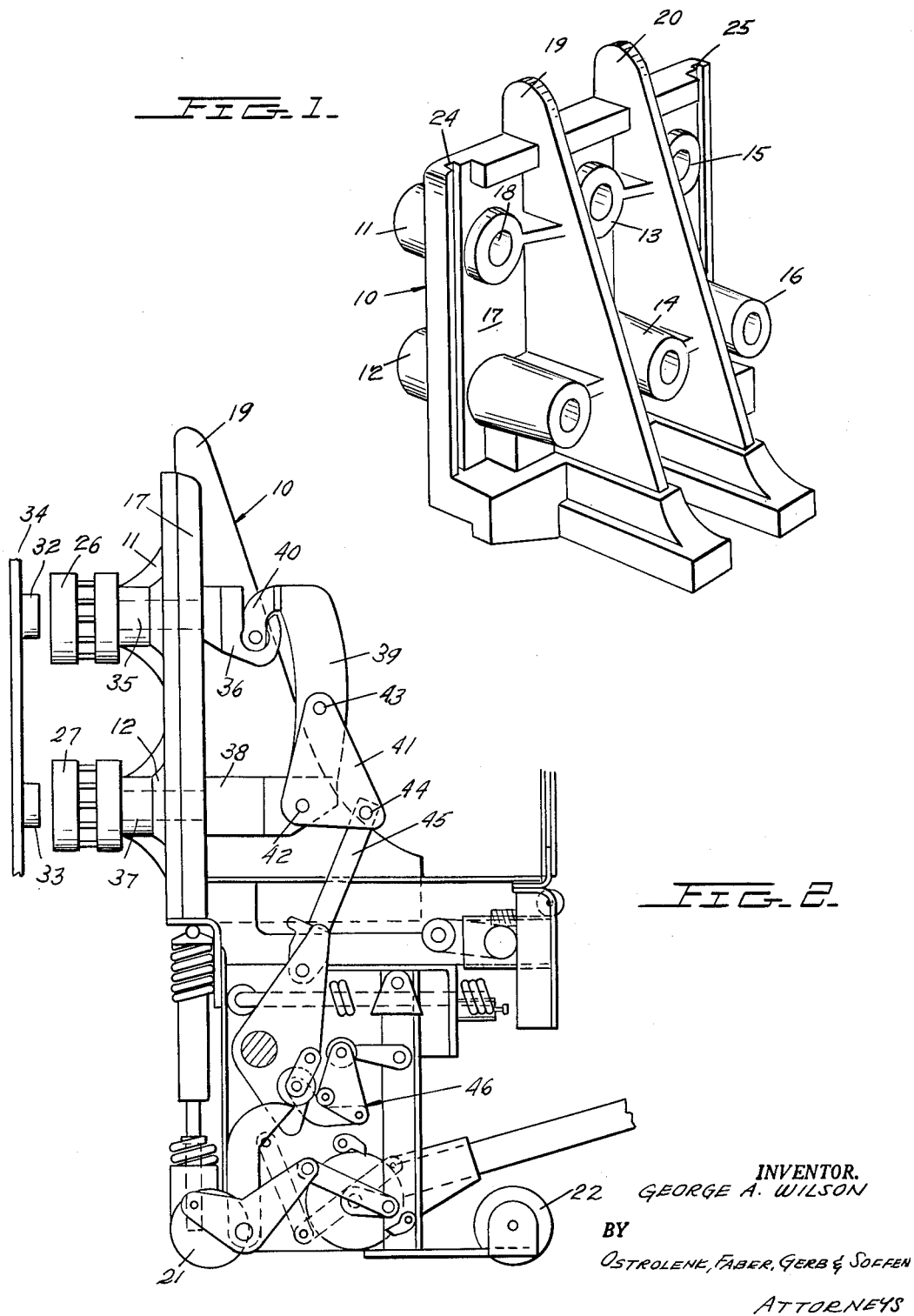
INVENTOR.
GEORGE A. WILSON
BY
OSTROLENK, FABER, GERB & SOFFEN
ATTORNEYS

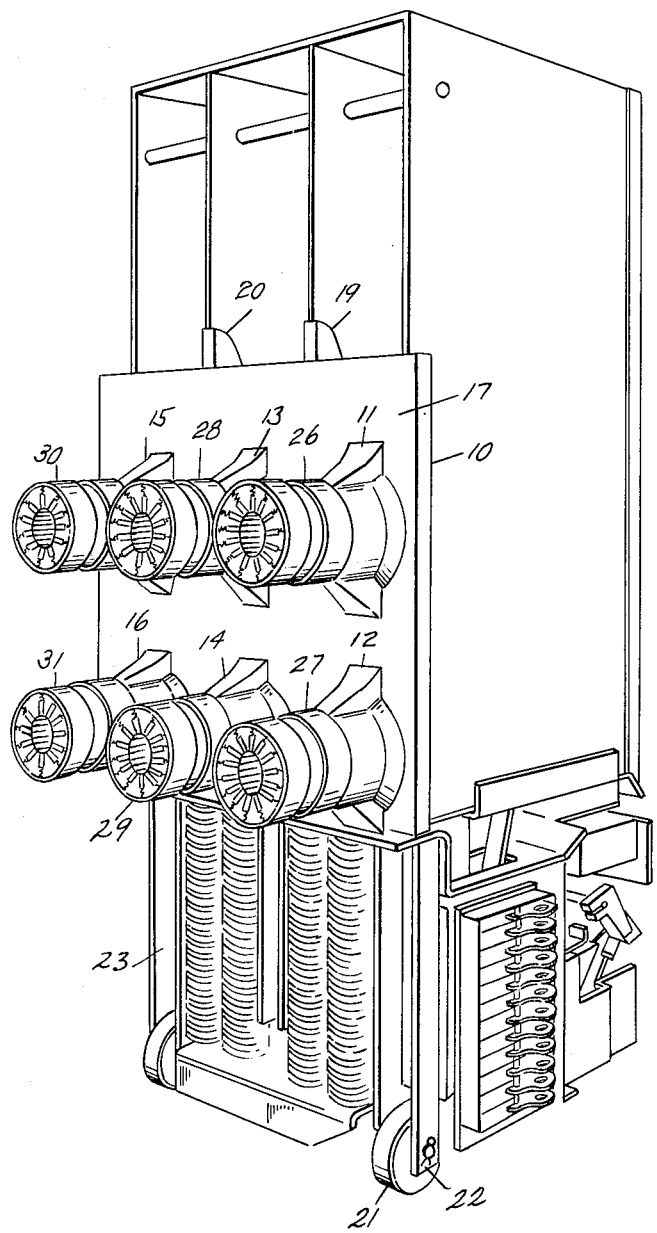

Patented July 2, 1963

3,096,423
UNITARY MULTI-PHASE TERMINAL SUPPORT
George A. Wilson, Media, Pa., assignor to I-T-E Circuit Breaker Company, Philadelphia, Pa., a corporation of Pennsylvania
Filed Feb. 24, 1960, Ser. No. 10,625
1 Claim. (Cl. 200—168)

This invention relates to a unitary molded support for supporting the rear disconnect contacts and for providing an interphase barrier for draw-out type switchgear.

Draw-out type switchgear are well-known in the art wherein the complete switching device is carried in a movable truck that may be moved into and out of a metal cubicle which normally houses the circuit interrupter. In these devices, the rear of the draw-out device is provided with disconnect contacts which cooperate with cooperating contacts which are stationarily carried in the wall of the cubicle. These disconnects, of course, are necessary to permit connection and disconnection of the circuit interrupter in the circuit to be protected since it is desirable to withdraw the complete mechanism from the cubicle for inspection or repair.

In the past, the disconnects carried by the draw-out unit have been individually mounted to the rear of the draw-out unit, and individual barriers have been provided within the interior of the draw-out unit between the various phases when a multi-phase unit is utilized.

The principle of the present invention is to provide a single and unitary molded panel which may be formed of an epoxy type resin and serves the purpose of the rear panel, the disconnect contact support, and the interphase barrier which is positioned between the phase of the multi-phase unit.

Accordingly, a primary object of my invention is to provide a novel unitary panel for draw-out switchgear.

Another object of my invention is to provide a simple and economical means of carrying the disconnect contacts of a draw-out unit.

Yet a further object of my invention is to provide a novel unitary molded member for carrying the disconnect contacts of a multi-phase draw-out circuit breaker and for providing interphase barriers between the stationary contacts of the circuit interrupter.

These and other objects of my invention will become apparent from the following description when taken in connection with the drawings, in which:

FIGURE 1 shows a perspective view of my novel unitary molding for a three-phase draw-out unit.

FIGURE 2 shows a side cross-sectional view of my novel unitary molding as it is mounted on a draw-out unit.

FIGURE 3 shows a perspective view of FIGURE 2 as seen at an angle to the rear and specifically shows the connection of the disconnect contacts carried by the unitary barrier.

Referring now to the figures, my novel unitary molding 10 is provided with integral tubular members 11, 12, 13, 14, 15 and 16 which extend through the rear panel section 17 and are provided with support flanges to render them more rigid on either side of rear panel 17. Each of integral tubular members 11 through 16 has openings such as opening 18 in tubular member 11 which extend completely through and are adapted to receive conductor members as will be described hereinafter.

Also integral with panel 10 are two interphase barriers 19 and 20 as seen in FIGURES 1 and 2 which, as will be seen hereinafter, are adapted to extend between the stationary contact structures of the multi-phase circuit breaker of the draw-out unit.

The manner in which the novel unitary panel of FIGURE 1 is mounted and utilized is best seen with reference to FIGURES 2 and 3 which show the panel in connection with a draw-out circuit breaker structure. The draw-out circuit breaker structure may be of any standard and well-known type. By way of example, U.S. Patent No. 2,840,653 in the name of Caswell and entitled "Circuit Breaker Racking Mechanism" and assigned to the assignee of the present invention shows a typical type of draw-out unit which can be adapted with the rear panel of the present invention.

As a further example, the novel panel can be used in the type of draw-out structure shown in co-pending application Serial No. 732,618, filed May 2, 1958, now Patent No. 2,921,998, in the name of Pokorny et al., entitled "Four Position Draw-Out Circuit Breaker" and assigned to the assignee of the present invention.

Thus, in FIGURE 2, the draw-out unit is comprised of a frame mechanism which is movable on wheels such as wheels 21 and 22. The frame mechanism extends upwardly as illustrated by frame members 22 and 23 in FIGURE 3, and these frame members can receive the unitary molding 10 in any desired manner. By way of example, in FIGURE 1 the unitary molding is illustrated as having two vertical slots 24 and 25 which have a configuration to receive the upwardly extending frame members. The frame members are then secured in these slots in any desired manner.

The extending members 11 through 16 then support disconnect contacts 26, 27, 28, 29, 30 and 31, respectively, which are tulip type clusters of contacts and are formed in the usual manner and are adapted to cooperate with protruding cooperating contacts carried by the rear of the cubicle within which the draw-out unit is mounted.

By way of example, in FIGURE 2 stationary contacts 32 and 33 which are carried by rear wall 34 of the cubicle cooperate with disconnects 26 and 27, respectively, which are carried by the draw-out unit and are mounted within the unitary molding 10. Each of disconnects 26, 28 and 30 is then provided with an extending conductive member such as the conductive member 35 shown in dotted lines in FIGURE 2 which extends through barrier 17 and terminates on a stationary contact structure such as stationary contact structure 36 for conductor 35.

In a like manner, a conductive member extends from each of disconnects 27, 29 and 31, such as conductive member 37 shown in dotted lines in FIGURE 2 which extends from disconnect 27, and these conductors terminate on a bottom contact arm support such as contact arm support 38 for the phase associated with conductor 37.

It is to be noted that the combined disconnect contact mounted on the rear of the panel, the conductor extending through the openings in the panel extensions such as opening 18 in FIGURE 1, the stationary contact structures such as stationary contact 36, and the lower contact arm support conductor 38 are all carried by panel 10 and are secured thereto in any desired manner.

Disconnects 26—27, 28—29 and 30—31 are provided for a respective phase of a multi-phase unit. Each of these phases is associated with, as illustrated in FIGURE 2 for the phase including disconnects 26 and 27, a movable contact arm 39 which is pivoted on lower conductor 38 and is movable into and out of contact engagement with contact member 40 of stationary contact 36. The operating mechanism for contact 39 which is common to the movable contact arm of each of the phases includes a plate 41 which is pivoted at pivot point 42 along with contact arm 39 and is connected at its upper end by pin 43 to contact arm 39. The rightwardly extending end of plate 41 is then pivotally connected by pin 44 to an operating shaft 45 which extends from a spring operated operating mechanism generally identified as operating mechanism 46.

It is to be noted that the operating mechanism illustrated in FIGURE 2 may be of any standard type and could, for example, be of the type fully described and illustrated in the above-noted U.S. Patent No. 2,840,653 to Caswell.

It will be apparent, however, that the type of operating mechanism used is of no consequence to the invention of the instant application which is directed to the unitary molded structure 10.

In addition to providing support means for the various disconnect contacts, stationary contact structure and lower contact support, the integral molding 10 further provides the aforementioned barriers 19 and 20. It will be apparent from a comparison of FIGURES 1, 2 and 3 that these barriers are positioned between the various phases of the interrupter whereby they substantially increase the creepage distance between adjacent contact structures. Thus, separate interphase barriers need not be provided and support means therefor need not be provided.

Although I have described preferred embodiments of my novel invention, many variations and modifications will now be obvious to those skilled in the art, and I prefer, therefore, to be limited not by the specific disclosure herein but only by the appended claim.

I claim:

A unitary rear panel and terminal support member for a three-phase draw-out switchgear unit; said unitary rear panel being comprised of a relatively flat plate portion adapted to span across the rear of said draw-out unit and being mountable to the rear of said draw-out unit; said flat plate portion having a plurality of tubular extensions extending from at least the rear surface thereof; said plurality of unitary tubular extensions having openings extending therethrough in a direction substantially perpendicular to said flat plate portion; said unitary tubular extensions having relative positions in accordance with predetermined disconnect contact positions of said three-phase draw-out unit; each of said tubular extensions being adapted to receive a respective disconnect contact structure for said draw-out unit; said opening in said tubular extensions being operable to pass conductive means connected to said disconnect contact structures to the front surface of said flat plate portion; said front surface of said flat plate portion having integral barriers extending perpendicularly therefrom and being adapted to electrically isolate conductive components of different phases of said multi-phase draw-out unit which are positioned adjacent to said front surface of said flat plate portion said plurality of unitary tubular extensions comprising first, second and third pairs of said extensions being adapted respectively to receive first, second and third pairs of stationary contacts of said three phase draw-out switchgear unit; the tubular extensions of each of said pairs being in vertical alignment; said pairs being arranged in a horizontal manner along said panel; said first barrier being vertically aligned between said first and second pairs of tubular extensions; said second barrier being vertically aligned between said second and third pairs of tubular extensions, said first and second barriers being adapted to provide suitable support for said panel thereby avoiding the necessity for additional vertical supporting barriers along said panel; first and second horizontally aligned supporting ribs for joining respectively the tubular extensions of said first pair of extensions to said first vertical barrier; third and fourth horizontally aligned supporting ribs for joining respectively the tubular extensions of said first pair of extensions to said second vertical barrier; fifth and sixth horizontally aligned supporting ribs for joining respectively the tubular extensions of said second pair of extensions respectively to both said first and second vertical barriers; all of said horizontally aligned supporting ribs being positioned along the front surface of said panel for providing a rigid unitary structure.

References Cited in the file of this patent

UNITED STATES PATENTS

| | | |
|---|---|---|
| 2,847,541 | McCarty et al. | Aug. 12, 1957 |
| 2,863,969 | Edmunds | Dec. 9, 1958 |
| 2,866,043 | Dickinson et al. | Dec. 23, 1958 |

FOREIGN PATENTS

| | | |
|---|---|---|
| 556,690 | Belgium | Apr. 30, 1957 |
| 655,585 | Germany | Jan. 19, 1938 |